United States Patent
Yadegar et al.

(10) Patent No.: US 10,477,225 B2
(45) Date of Patent: Nov. 12, 2019

(54) METHOD OF ADAPTIVE STRUCTURE-DRIVEN COMPRESSION FOR IMAGE TRANSMISSION OVER ULTRA-LOW BANDWIDTH DATA LINKS

(71) Applicant: UtopiaCompression Corporation, Los Angeles, CA (US)

(72) Inventors: Jacob Yadegar, Los Angeles, CA (US); Hai Wei, Los Angeles, CA (US); Joseph Yadegar, Los Angeles, CA (US)

(73) Assignee: UtopiaCompression Corporation, Los Angeles, CA (US)

( * ) Notice: Subject to any disclaimer, the term of this patent is extended or adjusted under 35 U.S.C. 154(b) by 91 days.

(21) Appl. No.: 14/311,083

(22) Filed: Jun. 20, 2014

(65) Prior Publication Data

US 2017/0195681 A1 Jul. 6, 2017
US 2017/0310982 A9 Oct. 26, 2017

Related U.S. Application Data

(63) Continuation of application No. 13/431,920, filed on Mar. 27, 2012, now Pat. No. 8,798,383.

(60) Provisional application No. 61/465,957, filed on Mar. 28, 2011.

(51) Int. Cl.
*H04N 19/42* (2014.01)
*H04N 19/30* (2014.01)
*H04N 19/25* (2014.01)
*H04N 19/136* (2014.01)
*H04N 19/65* (2014.01)

(52) U.S. Cl.
CPC .......... *H04N 19/42* (2014.11); *H04N 19/136* (2014.11); *H04N 19/25* (2014.11); *H04N 19/30* (2014.11); *H04N 19/65* (2014.11)

(58) Field of Classification Search
CPC ....... H04N 19/42; H04N 19/65; H04N 19/136
See application file for complete search history.

(56) References Cited

U.S. PATENT DOCUMENTS

| | | | | |
|---|---|---|---|---|
| 6,389,177 | B1* | 5/2002 | Chu | G06T 9/00 382/168 |
| 2004/0240543 | A1* | 12/2004 | Faroudja | H04N 19/30 375/240.01 |
| 2005/0036759 | A1* | 2/2005 | Lin | H04N 19/52 386/331 |
| 2006/0188168 | A1* | 8/2006 | Sheraizin | G06T 5/002 382/254 |
| 2009/0003720 | A1* | 1/2009 | Sun | H04N 1/41 382/254 |
| 2011/0055895 | A1* | 3/2011 | Roskowski | H04W 4/02 726/3 |
| 2012/0134597 | A1* | 5/2012 | Finch | G06T 17/00 382/201 |

* cited by examiner

*Primary Examiner* — Tat C Cho
(74) *Attorney, Agent, or Firm* — Barlow, Josephs & Holmes, Ltd.

(57) ABSTRACT

An encoding-decoding method and system is provided where the encoding process or system are not a mirror image of the decoding process or system.

13 Claims, 10 Drawing Sheets

900

METHOD OF ADAPTIVE STRUCTURE-DRIVEN COMPRESSION FOR IMAGE TRANSMISSION OVER ULTRA-LOW BANDWIDTH DATA LINKS

CROSS-REFERENCES TO RELATED APPLICATIONS

This application is a continuation of application Ser. No. 13/431,920, filed Mar. 27, 2012, now U.S. Pat. No. 8,798,383. The patent application identified above is incorporated here by reference in its entirety to provide continuity of disclosure.

GOVERNMENT RIGHTS STATEMENT

This invention was made with Government support. THE GOVERNMENT HAS CERTAIN RIGHTS IN THIS INVENTION.

FIELD OF THE INVENTION

The present invention relates generally to codec systems, more specifically the present invention relates to method and apparatus with Adaptive Structure-Driven Compression for Image Transmission over Ultra-Low Bandwidth Data Links.

BACKGROUND

Driven by the growing demand for efficient storage and transmission of visual information, significant progress has been made in image and video compression technologies during the past decades. However, most of the current image compression standards and technologies are, to a large extent, still data-driven. These known compression standards and technologies are designed to minimize the overall pixel-wise distortion, such as mean square error. Since data-driven methodology do not take full advantage of the rich information in the image data, these existing methods usually lead to low or moderate data reduction and have no guarantee for good perceptual/subjective quality of reconstructed images, especially in low bit-rate scenarios and for low-bandwidth image transmission applications. Regarding perceptual/subjective quality of reconstructed images, an example would be a scenario before a missile hits its designated target an image of the target is fed back to a human operator for a determination. The image of the target may merely fit the good perceptual/subjective quality rather than an objective one due to limitations such a band width, etc.

As can be seen, image and video compression compared with other types of data such as text, voice, etc. Attempting to address this problem, there have been some research efforts in developing the so-called feature-based image compression techniques. These feature-based image compression (FBIC) approaches strive to achieve higher coding efficiency and better perceptual quality by identifying and encoding different features in image data according to the properties of human visual system (HVS). The image model often used characterizes the image content as regions surrounded by contours. With such an image model, the FBIC techniques can be roughly categorized into two classes. The first is usually called region-based approach, which partitions the image into homogeneous closed regions and utilizes the uniformity of each of the segmented regions. The second class, often named as contour-based approach, extract and encode edge segments (as discontinuities between regions) and use them to reconstruct an approximation of the original image. In addition, there were also efforts to develop hybrid coding schemes by combining the classic transformed-based and the feature-based approaches.

As can be seen, in the technology of image transmission/communication an application with ultra-low bandwidth and runtime constrains requires the maximization of the perceptual/subjective quality of the reconstructed image. The classic transform-based techniques are unsuitable in this context and improvement is desired. Furthermore, none of the known feature-based compression techniques can be directly applied to satisfy the bandwidth constrain or meet the runtime requirements, primarily due to the lack of efficient coding (of the visually significant features) and the high computational complexity exhibited by the existing algorithms.

Therefore to address the above inefficiency, it is desirous to have an improved, practical, and efficient compression solution, to enable ultra-low bandwidth image communication/transmission.

SUMMARY OF THE INVENTION

In an image transmission/communication system in which an application with ultra-low bandwidth and runtime constrains is provided.

In an image transmission/communication system in which the maximization of the perceptual/subjective quality of the reconstructed image is provided.

In an image transmission/communication system an Adaptive Edge-Pattern-based Image Compression (AEPIC) method, based on a novel pattern-drive image model is provided. The invented AEPIC method exploits the structural discontinuities in the image and encodes the corresponding geometric and intensity profiles using efficient geometric and statistical modeling techniques. The AEPIC associated with a machine such as a computer extracts and prioritizes structural boundaries in the image, and contingent on the bit budget, only encodes and transmits the most salient edge features, therefore achieving a scalable bit-stream with minimized bit cost and maximized subjective quality.

In an image transmission/communication system an improved, practical, and efficient compression solution, to enable ultra-low bandwidth image communication/transmission is provided. The system satisfies both the perceptual/subjective quality requirements and runtime constraint.

An adaptive structure-driven image compression method is provided. The method produces encoded image bit-streams with reduced bit cost and maximized subjective quality for enabling efficient image transmission/communication over ultra-low bandwidth data links.

Progressive channel-bandwidth-adaptive schemes that enhance the adaptive structure-driven image compression method are provided. These schemes render the generated image bit streams highly scalable, and enable the image reconstruction based on partial or incomplete bit streams.

A method suitable for computer implementation of the adaptive structure-driven image compression is provided. The method provides a novel, practical and efficient compression solution for realizing ultra-low bandwidth image communication while satisfying both the perceptual/subjective quality requirements and runtime constraint.

A non-symmetrical codec system is provided for narrow band environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
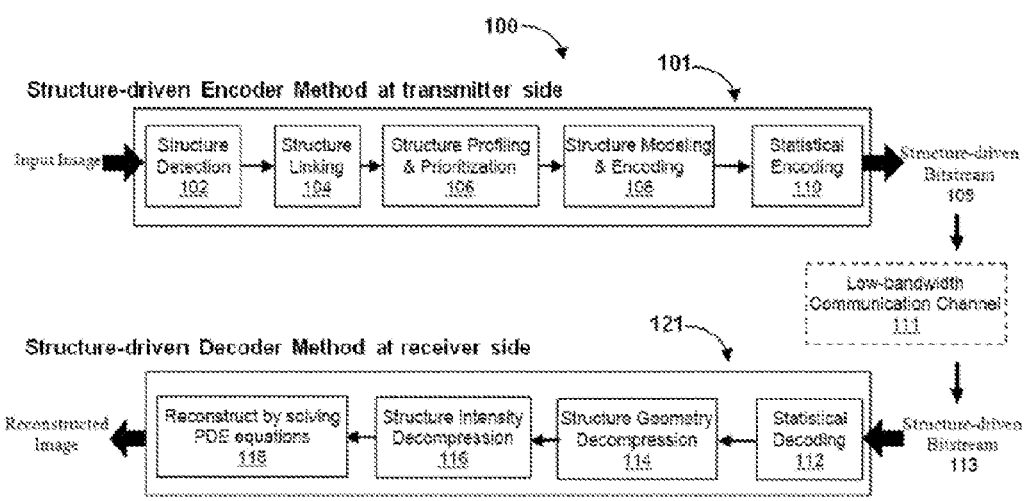
FIG. 1 is an example a codec in a communication system in accordance with some embodiments of the invention.

Before describing in detail embodiments that are in accordance with the present invention, it should be observed that the embodiments reside primarily in combinations of method steps and apparatus related to Adaptive Structure-Driven Compression for Image Transmission over Ultra-Low Bandwidth Data Links. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of using a combination of a codec for Adaptive Structure-Driven Compression for Image Transmission over Ultra-Low Bandwidth Data Links described herein. The non-processor circuits may include, but are not limited to, a radio receiver, a radio transmitter, signal drivers, clock circuits, power source circuits, and user input devices. As such, these functions may be interpreted as steps of a method to perform using a codec for Adaptive Structure-Driven Compression for Image Transmission over Ultra-Low Bandwidth Data Links. Alternatively, some or all functions could be implemented by a state machine that has no stored program instructions, or in one or more application specific integrated circuits (ASICs), in which each function or some combinations of certain of the functions are implemented as custom logic. Of course, a combination of two of any above approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the pattern-driven context of the present invention, image data, and specifically structures and regions with defined visual patterns therein, are considered as relational and classifiable entities. Furthermore, these entities also include the relationships and the frequency of their occurrence of the structures and regions with defined visual patterns. In general, three typical and dominant visual patterns one often observes in photographic and natural/urban scene images, are: (1) flat or homogeneous patterns/regions (HP)—which can be modeled well by simple linear models; (2) structural lines, curves and boundaries which indicate the surface discontinuities or slope discontinuities (SD) and can be modeled and represented geometrically with high accuracy, and (3) complex or composite patterns/regions (CP), which usually require both linear and/or non-linear modeling methods for their accurate, compact and efficient representation. Concisely, the pattern-based image model f can be loosely defined as:

$$f_{image} = f_{HP} \cup f_{SD} \cup f_{CP}$$

With such a pattern-driven image model, it is easy to see that one can achieve efficient compression by designing and developing novel ways of representing and modeling different (simple, structural and complex) visual patterns using a minimal set of extracted features. Furthermore, depending on the given application, different features can be selected, prioritized, and encoded according to the image characteristics and the visual patterns therein for compression performance optimization.

Specifically, for the ultra-low bandwidth image transmission/communication applications, the SD component $f_{SD}$ (i.e. structural discontinuities and/or boundary lines/curves) of the pattern-based image model plays a more critical role compared with the other two visual patterns (i.e. $f_{HP}$ and $f_{CP}$). Since the objective here is to maximize the perceptual/subjective quality of the reconstructed image with the extremely low bit budget, the pattern-based image compression should focus on the extraction and prioritization of the structural boundaries in the image. Contingent on the bit budget, the structure-driven image compression method only encodes and transmits the most salient structural features from the $f_{SD}$, thereby achieving a scalable bit-stream with minimized bit cost and maximized subjective quality.

Referring to FIG. 1, an overall framework of a codec system 100 of an Adaptive Edge-Pattern-based Image Compression (AEPIC) method is shown. In framework 100, major computational modules involved include (in the encoder side 101): edge or structure detection 102, thinning and linking, or structure linking 104, edge profiling and prioritization 106, and structure modeling and encoding 108 of selected edge segments (not shown in FIG. 1). The details of each module are provided infra.

Referring again to FIG. 1 at the encoder side 101, a subject input image signal is input into codec system 100 at structure detection 102 block. The processed subject input image signal is processed by structure detection 102 block. In structure detection 102 for a given input image, the primary structural information (in the form of grouped edge pixels) is extracted. Structure linking 104 is coupled to structure detection 102 in that the output of structure detection 102 block is subjected to structure linking 104. In structure linking 104, individual structure points (i.e. edge pixels) are linked and additional pixels are removed to obtain a single-pixel-width structural chain. Structure profiling and prioritization 106 block is coupled to structure linking 104 in that the output of structure linking 104 is subjected to structure profiling and prioritization 106. In structure profiling and prioritization 106 for each of the structural chains, its profile including geometric locations and intensity values are computed and used to prioritize the structural chains (with the most important chains will be processed first).

Structure modeling and encoding 108 is coupled to structure profiling and prioritization 106 in that the output of structure profiling and prioritization 106 is subjected to structure modeling and encoding 108. In structure modeling and encoding 108, the geometric and intensity profiles of each structural chain is encoded using a combination of transform-based and prediction-based encoding techniques (see further detailed in FIG. 2a infra).

Statistical encoding 110 is coupled to structure modeling and encoding 108 in that the output of structure modeling and encoding 108 is subjected to statistical encoding 110. In statistical encoding 110, the additional statistical redundancy in the encoded structural chain profile is reduced by applying adaptive statistical encoding to further reduce the size of the generated bitstream 109 or the encoder side bitstream.

The output of statistical encoding 110 is the output of the encoder 101 in the form of a encoder side bitstream 101 in which a Structure-driven scalable bit stream 109 (as compressed format of the input image) is produced. The structure-driven bit stream 109 is communicated from the transmitter side or the encoder side 101 to the receiver side or decoder side 121 via any available low-bandwidth communication channel 111.

Complete or part of the structure-driven bit stream 113 is received at the receiver or decode side 121 forming a received bitstream 113, which is substantially used as the input to the decoder 121 or receiver. The decoder 121 is coupled to the encoder 110 and substantially receives the bitstream 109 output from the encoder 101 subject to the any available low-bandwidth communication channel 111.

Referring yet more specifically to the encoder 101, at block structure detection 102, structural discontinuities and/or boundary lines/curves present themselves in various scales. In the present embodiment of the ASDIC framework, a multi-scale edge detector is used to extract primary structural information in a given image. Using a known multi-scale edge model in, an edge is characterized as a step edge blurred by a Gaussian kernel of standard deviation $\sigma_b$ and corrupted with zero mean uncorrelated Gaussian noise n:

$$I(x) = I_1 + \frac{I_2 - I_1}{2}\left(\text{erf}\left(\frac{x}{\sqrt{2}\sigma_b}\right) + 1\right) + n, \quad (1)$$

where I(x) expresses the image intensity in the normal direction of the edge (x=0 at the location of edge). With this multi-scale edge model, one can not only find the edge location, but also estimate the parameters $I_1$, $I_2$ and $\sigma_b$ for every edge pixel (where $I_1$ and $I_2$ are the intensity values on the two sides of the edge segment). The function erf is the standard error function given by:

$$\text{erf}(z) = \frac{2}{\sqrt{\pi}} \int_0^z e^{-t^2} dt. \quad (2)$$

The standard deviation of the Gaussian noise n is either estimated from the smooth part of an image, or typically it is user supplied. It should be noted that for faster computation, the popular Canny Edge Detection method[20] or any other multi-scale edge detect methods can be used. For Canny method, the edge detection results are usually controlled by three parameters—two hysteresis threshold parameters and a standard deviation of the Gaussian smoothing kernel.

At block structure linking 104, all the structure points (namely the edge pixels detected) go through thinning and linking processes. The edge thinning process removes "extra" edge pixels (by morphological operations) and form one-pixel width edge pixel groups. The edge link process tracks edge pixels to form edge contours. After the edge thinning and linking steps, all the edge pixels are linked to form contours of the structures and objects in the image data. Next, the edge contours need to be decomposed into manageable structural chains, especially for those with branching or junction points. The breaking of the edge contours should not only maintain the integrity of the object contours and structures, but also facilitate the subsequent modeling and encoding of the edge data. The present method use the following criteria to achieve effective structural chain decomposition: (1). Maximize the length of each structural chain. (2). For branching points and junctions, pick the next tracking edge pixel, which has minimum gradient variation to obtain a smooth transition (between edge segments).

Further regarding block 106 since not all the structural chains are equally important to the quality of the reconstructed image data, the structural chains should be selected and prioritized to allow scalable modeling and encoding. For example, a Human Vision System or a human operator within the system for determining a transmitted image have characteristics such as more acceptable or sensitive to certain shapes, lines, or contours. Therefore, firstly, structural chains with the number of edge pixels less than a given threshold are eliminated. Secondly, a structural profiling procedure is performed for each of the retained structural chains.

The structural profiling procedure creates edge profiles (or model parameters) for linked and thinned edge pixels based on a binary edge map, edge chain list, consolidated gradients, and consolidated magnitude of second derivative. An edge is characterized by five parameters: spatial coordinates x and y, intensity values $i_1$ and $i_2$ on both sides, and (optional) blur of the edge point.

The structural profiling procedure proceeds as follows: First perform the distance transform on the binary edge map to facilitate the finding of $i_1$ and $i_2$. Next, from each side of a structural chain within a distance of two pixels, choose the location of the maximum distance transform values. Lastly, at those maximum points interpolate the image intensities and the two-intensity pairs across an edge will become $i_1$ (high intensity) and $i_2$ (low intensity) in a structural profile.

For interpolating the distance transform at a non-grid point, the bi-linear interpolation method is utilized.

For prioritizing structural chains, several factors are considered: (a) the length of the structural chain l, (b) the contrast/sharpness of the structural chain c (measured by the average difference between $i_1$ and $i_2$ for a structural chain), (c) Average blur parameter σ, and (d) the distance of the structural chain from the center of the image d. With these factors, a ranking function can be constructed as:

$$\text{rank}(e_i) = w_l \cdot l_i + w_c \cdot c_i + w_\sigma \cdot \sigma_i + w_d \cdot d_i \quad (3)$$

in which $e_i$ is a given structural chain with $w_l$, $w_c$, $w_\sigma$, and $w_d$ being the weights for various factors (not shown) including factor specific to a particular situation. With this criterion, long and sharp structural chains that reflect the contours of the main structures and object boundaries will have higher priority than the short and blurred structural chains.

The ranking function can be further enhanced by taking into account some of the specifics of the applications. For instance, if man-made objects/structures are of the most importance, then it becomes necessary that these objects be encoded first in preference to natural objects in the scene like vegetation and other elements of the landscape. One important characteristic of natural objects is that they feature a large number of corners, or in other words the smoothness of the contours of natural objects is typically very low. On the other hand, man-made objects like buildings or ships typically have fewer corners and more regular contours. A simple way to measure the regularity of a structure chain is the number of anchor points resulting from the piecewise linear approximation of edges (performed in the edge modeling module as discussed in block 108). To make the measure more robust, it is proposed to use the ratio of length of an edge to the number of anchor points. In addition, geometric mean is used to construct the new ranking function:

$$\text{rank}(e_i) = (r_i \cdot c_i)^{1/2} \quad (4)$$

where $r_i$ is the ratio for measuring regularity of a given structural chain. The change of rank fusion from an arithmetic mean to a geometric mean helps emphasize structure chains that have more balanced ranks, rather than those that have a high imbalance in the rankings.

In addition, since the selected structural chains will be compressed using predictive coding technique (in the encoding stage), all the structural chains are sorted to further improve the coding efficiency. Firstly, for each structural chain, the starting edge point is "forced" to the end which is closer to the origin of the image plane (usually the upper left corner); secondly, all the structural chains are sorted according to the starting edge pixel locations of structural chains. In this way, the predictive coding will be applied both within each structural chain and across structural chains. This reduces the dynamic range of the structure modeling data, which will translate to the improvement of the coding efficiency in the compression stage.

Figure 4:
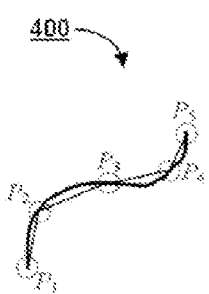
FIG. 4 is an example of a piecewise linear approximation for the structure geometry in accordance with some embodiments of the invention.

Further regarding block 108 for structure modeling and encoding, each structural chain is modeled with respect to its spatial location and intensity profile. For spatial location, piecewise linear approximation is performed globally on each structural chain to obtain a sequence of anchoring points (along the structural chain). These anchoring points will form the line segments in sequential order to approximate a structural chain with the given geometric error tolerance. An exemplified connected structural chain and its poly-line representation are depicted in FIG. 4 infra.

For the intensity profile of each structural chain, we only retain the $i_1$, $i_2$, and (optional) σ values at the anchor points (as result of the piecewise linear approximation). If the blur parameter is included in the edge profile, it can be estimated as:

$$\sigma_{i,j} = \sqrt{(d/2)^2 - s^2} \quad (5)$$

where i and j indicate the point locations, d is the distance in pixels between extrema in $2^{nd}$ derivative map, and s is the minimum reliable scale for second derivative operation.

Figure 2A:
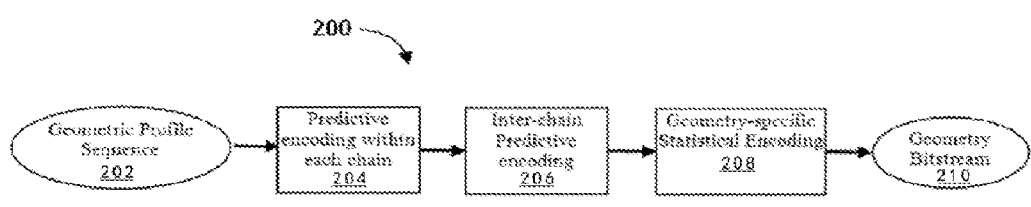
FIG. 2a is an example of a first part of an encoder in accordance with some embodiments of the invention.
Figure 2B:
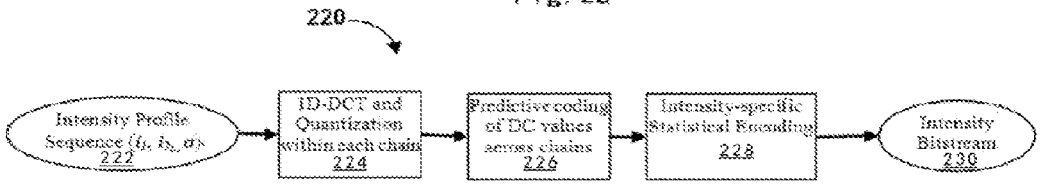
FIG. 2b is an example of a second part of an encoder in accordance with some embodiments of the invention.

Both structural geometry and intensity profiles need to be encoded to achieve compact representation. There are two ways of organizing all the structural information: (1) Encode the structural information as four separate sequences: anchoring point locations, $i_1$ sequences, $i_2$ sequences, and the blur estimate sequence, or (2) Encode all structural information as an order quadruple: (Anchor point locations, $i_1$, $i_2$, σ). Since the correlation is much stronger within each individual sequence, the first scheme is adopted in our preferred embodiment for organizing the different components of the structural modeling results. The anchoring point location sequence for each structural chain is encoded losslessly using differential pulse code modulation (DPCM) in order to preserve the accurate edge locations about which human observers are sensitive. In addition, the location data can be further compacted by doing a DPCM between the starting points of consecutive structural chains. For the $i_1$, $i_2$, and σ sequences, one-dimensional (1D) discrete cosine transform (DCT) is utilized to remove the high correlation among the intensity values along a structure chain. Following the 1D DCT, all the DC coefficients (first value of the DCT result of each structure chain) are further compressed using predictive encoding. The detailed process for encoding the structural modeling parameter sequences are depicted in FIGS. 2a and 2b.

Referring again to FIG. 1 at the decoder 121 or receiver side, the output of the encoder is substantially used as the input to the decoder 121 subject to the any available low-bandwidth communication channel 111. The input bitstream 113 in turn is input into decoder 121 via arithmetic decoding block 112. In arithmetic decoding block 112, the received structure-driven bit stream is first decompressed using statistical decoder to recover the encoded structural information (i.e. encoded geometric and intensity data).

Structure geometry decompression 114 block is coupled to arithmetic decoding block 112 in that the output of arithmetic decoding block 112 block is subjected to structure geometry decompression 114. In structure geometry decompression 114, the geometric profile of each received structure chain data is decoded by applying inverse operation to Step 4. For further details see FIGS. 3a and 3b infra. Structure intensity decompression 116 block is coupled to structure geometry decompression 114 in that the output of structure geometry decompression 114 is subjected to structure intensity decompression 116. In structure intensity decompression 116, the intensity profile of each received structure chain data is decoded by applying inverse operation to Step 4. For further details see FIGS. 3a and 3b infra.

Reconstruct by solving partial differential equations block 118 is coupled to structure intensity decompression block 116 in that the output of structure intensity decompression 116 is subjected to reconstruct by solving partial differential equations (PDE) 118. In reconstruct by solving PDE equations 118, with all the recovered structure chain data including geometric and intensity profiles, a sparse linear equation system is solved to reconstruct the image data based upon the input image signal. The output of reconstruct by solving PDE equations 118 is the output of the decoder 121 in the form of a reconstructed image.

It should be pointed out the low-bandwidth communication channel 111 is defined as wireless communications media where the speed of transmitting image data cannot achieve real time effect without further data processing and limiting the quantity of the image data transferred. It is further noted that the present invention contemplates in limited cases wireline communication media as well. Alternatively, a combination of wireless and wireline media for communication purposes. At least the low-bandwidth communication channel contemplated herein is not the presently known and used broadband communications systems such as long term evolution (LTE) system where sufficient bandwidth can achieve real or non-real time image transmission for significant quantity of image data.

It is noted that the overall schemes for encoding the edge modeling parameter sequences are depicted in FIG. 2.

Referring to FIG. 2a, a block diagram 200 depicting encoding of structure geometry profile is shown. Within each chain Predictive encoding 202 is performed without loss of information using such means as differential pulse code modulation (DPCM) in an edge chain. For example, for each of the structure chain geometric sequences, each point location uses its prior neighbor as the prediction. The difference is taken and encoded. In other words, for each of the structure chain geometric sequences, each point location uses its prior neighbor as the prediction and the difference is taken and encoded. Upon the predictive intra-chain encoding, the encode information is further subjected to inter-chain predictive encoding 204. In block 204, the first point locations between two adjacent structure chains (according to their prioritized order) are encoded with one serving as the predictor and the other as the differentiator. For example, DPCM is performed among a set of edge chains. The predictive encoded information is further subjected to geometry-specific statistical encoding 206. In block 206, Statistical encoding is customized to reduce the redundancy exhibited in all the geometric predictor and differentiator sequences. Thereafter, the encoded information forms a geometry bitstream 210 which is similar or identical to, a part of or the whole of the structure driven bitstream 109 of FIG. 1 supra.

Referring to FIG. 2b, a block diagram 220 depicting encoding of edge intensity profile is shown. An intensity profile ($i_1$, $i_2$, $\sigma$) 222 is input into 224 for one dimensional d (1D) discrete cosine transform (DCT) within each chain. In other words, for each of the structure chain intensity sequences, 1D discrete cosine transform (DCT) is performed within the current chain followed by chain specific quantization. In turn, the quantified intensity profile ($i_1$, $i_2$, $\sigma$) 222 is subjected to predictive coding of direct current (DC) values across chains 226. In other words, The DC (direct current) values of two adjacent intensity chains (according to their prioritized order) are encoded with one serving as the predictor and the other as the differentiator. The encoded is subjected to further intensity-specific statistical encoding 228. Statistical encoding 228 is customized to reduce the redundancy exhibited in all the intensity predictor and differentiator sequences. The result of encoding intensity profile ($i_1$, $i_2$, $\sigma$) 222 is an intensity bitstream 230 which is similar or identical to, a part of or the whole of the structure driven bitstream 109 of FIG. 1 supra.

As can be seen in FIGS. 2a and 2b, both edge geometry and intensity profiles need to be encoded to achieve compact representation. There are two ways of organizing all the edge information. The first way is to encode the edge information as four (4) separate sequences. The four (4) separate sequences include: (1) anchoring point locations sequences, (2) $i_1$ sequences, (3) $i_2$ sequences, and (4) the blur estimate sequence. The second way is to encode all edge information as an order quadruple of Anchor point locations having parameters $i_1$, $i_2$, $\sigma$. Since the correlation is much stronger within each individual sequence, the first scheme for organizing the different components of the edge modeling results is adopted. The anchoring point location sequence for each edge chain is encoded losslessly using differential pulse code modulation (DPCM) in order to preserve the accurate edge locations about which human observes are sensitive. In addition, the location data can be further compacted by doing a DPCM between the starting points of consecutive edge chains. For the $i_1$, $i_2$ and $\sigma$ sequences, one-dimensional (1D) discrete cosine transform (DCT) is utilized to remove the high correlation among the intensity values along an edge chains. Following the 1D DCT, all the DC coefficients (which is defined as the first value of the DCT result of each edge chain) are further compressed using DPCM.

Figure 3A:
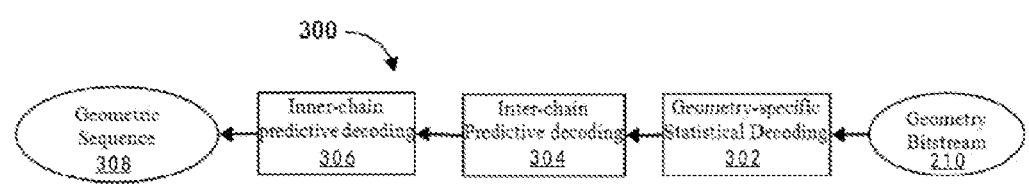
FIG. 3a is an example of a first part of a decoder in accordance with some embodiments of the invention.

Referring to FIG. 3a, a diagram 300 depicting decoding of edge geometries or structure geometries is shown. The transmitted geometric bitstream 210 of FIG. 2a is used as input to block 302 where geometry-specific statistical decoding is performed. In block 302, for each of the structure chain geometric sequences received, geometric-specific statistical decoding is performed to recover the geometric predictor and differentiator sequence data. In turn, inter-chain predictive decoding 304 is performed. In block 304, the first point locations between two adjacent structure chains are decoded by adding the differentiator back to the predictor (starting from the first point location of the first structure chain received). Geometry bitstream 210 is further subjected to intra-chain or inner-chain predictive decoding 306. In block 306, the differential locations within each structure chain are added back to its predictor locations to recover losslessly the full geometric location of each anchor point along the structure chain. Geometric sequence 308 is decoded.

Figure 3B:
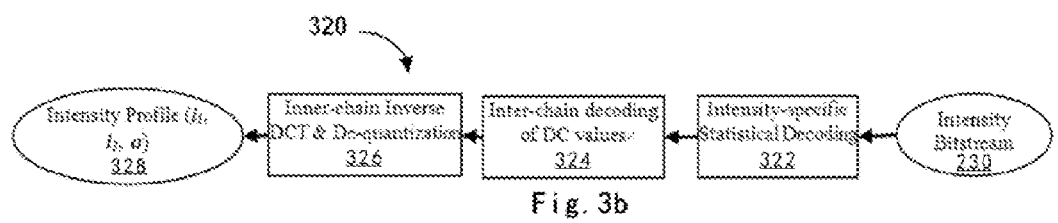
FIG. 3b is an example of a second part of a decoder in accordance with some embodiments of the invention.

Referring to FIG. 3b, a block diagram 320 depicting decoding of edge or structure intensity profile is shown. The intensity bitstream which is the transmitted intensity bitstream 230 of FIG. 2b is used as input to block 322 where intensity specific statistical decoding is performed. In block 322 for each of the structure chain intensity sequences received, intensity-specific statistical decoding is performed to recover both the DC and AC parts of the intensity sequences.

The decoded intensity bitstream is further subjected to block 324 where interchain decoding of DC values is performed. In block 324, the DC (direct current) values of two adjacent intensity chains (according to their prioritized order) are decoded by adding the differentiator DC value back to the predictor DC value. The output of block 324 is further subjected to block 326 where inner-chain or intra-chain inverse DCT & De-quantization is performed. In block 326, within each structure chain, inverse 1D discrete cosine transform is performed followed by de-quantization to recover the approximated intensity sequences. In turn, the decoded Intensity Profile ($i_1$, $i_2$, $\sigma$) 328 is achieved.

Referring to FIG. 4, a piecewise linear approximation for the structure geometry is shown. As can be seen, the curve 400 is approximated by line segments connecting between points P1, $P_2$, $P_3$, $P_4$, and $P_5$. In other words, for each of the structure chains, its geometry is approximated by a sequence of anchor points ($P_1$, $P_2$, $P_3$, $P_4$, and $P_5$ in this example) along the chain which captures the most salient parts of the curvature for a given geometric error tolerance.

Figure 5A:
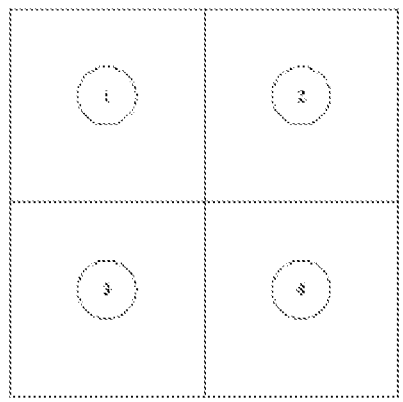
FIG. 5a is an example of a first block-based data partitioning and ordering scheme in accordance with some embodiments of the invention.

Referring to FIG. 5a, a four (4) block-based data partitioning and ordering schemes is shown.

Figure 5B:
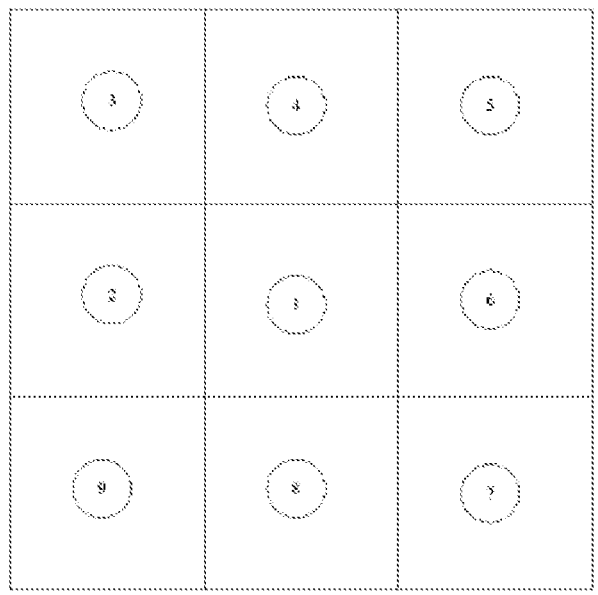
FIG. 5b is an example of a second block-based data partitioning and ordering scheme in accordance with some embodiments of the invention.

Referring to FIG. 5b, a nine (9) block-based data partitioning and ordering schemes is shown.

Referring to FIGS. 5a and 5b, for both FIG. 5a and FIG. 5b the box with bold lines represents a given input image, which is partitioned into several blocks (in our cases four and nine blocks respectively) to facilitate the progressive encoding and transmission. Note: the numbers within the circle indicate the priorities of that specific block. The less the number, the higher the priority that block has.

It should be noted that the present invention contemplates achieving runtime reduction using block based scheme. The blocks are not limited to four (4) only. Other numbers or positive integers about four (4) may be used.

Figure 6:
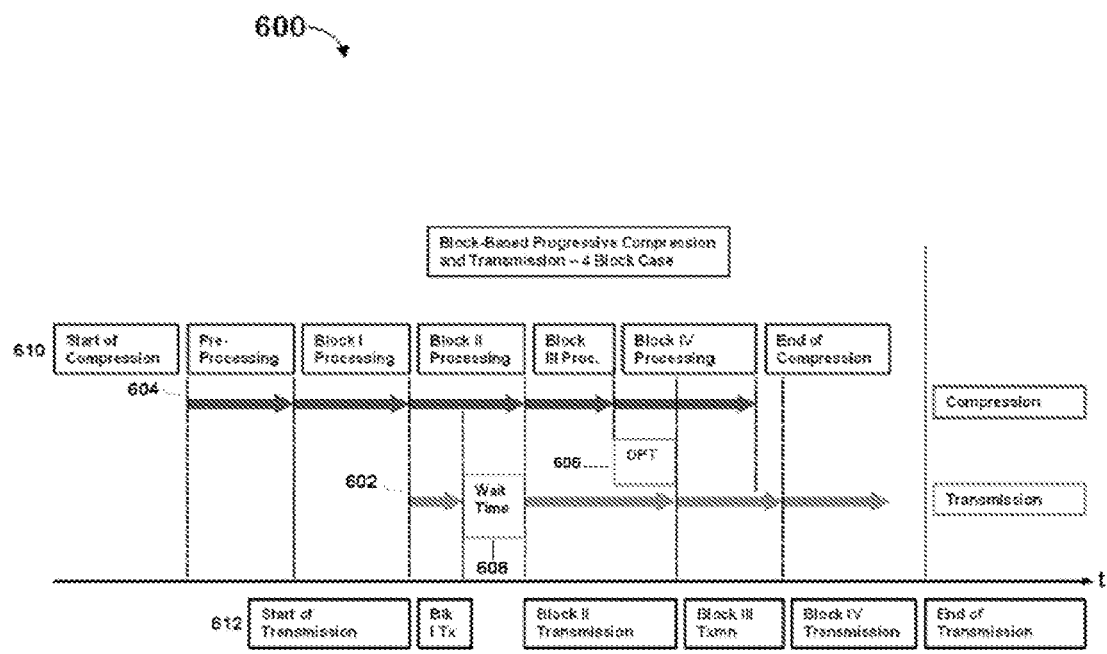
FIG. 6 is an example of a block-based progressive compression and transmission diagram in accordance with some embodiments of the invention.

Referring to FIG. 6, a block-based progressive compression and transmission diagram 600 is shown. The lower level arrows 602 depict transmission stages while upper level 604 arrows the compression stages. OPT refers to Overlapped Processing and Transmission, indicated by numeral 606, while Waiting time is represented by a block having numeral 608.

The Processing and Transmission of blocks form two separate streams, i.e. the processing stream 610 and the transmission stream 612. While the transmission stream 612 has to wait for the processing stream 610, the reverse is not true. The timing of the processing module is independent of the transmission module. The processing module in the case of a 4-Block Progressive Encoding comprises of a Pre-processing step, followed by processing of the 4 blocks and finally a Post-Processing step. The time spent at the Post-processing is negligible and is not depicted in the diagram. The transmission module can start only after the pre-processing and the processing of the first block is completed. Also every successive block transmission module can start only after the corresponding block processing module has completed. In other words, the transmission has to temporarily stop and wait for the processing to complete, in case the next block for transmission has not been compressed. This is depicted by box 608. On the other hand, in case the transmission of a block takes longer than the time required to process the next block, the processing does not stop, but continues with the processing of the next block. This is based on an assumption that the transmit buffer available is large enough to accommodate for all the blocks. The overlapped block processing and transmission is indicated by block 606. It is important to make sure that a trade-off is made to keep the time required for processing each block lower than the time required for transmitting it. In other words the estimated time required to transmit each block should be used as a bound to optimize the block-processing computation.

Figure 7:
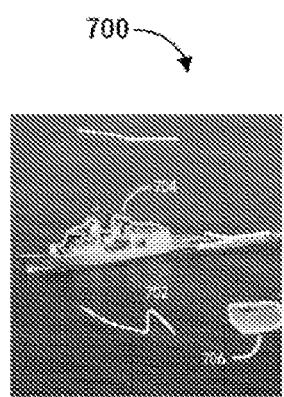
FIG. 7 is an example that depicts the concept of edge-chain-based data partition in accordance with some embodiments of the invention.

Referring to FIG. 7, a Concept of edge-chain-based data partition 700 is shown. The curves i.e. curve 702, curve 704, and curve 706 indicates the structure chains detected/extracted from a given input image. Different structure chains are separated and prioritized according to a priority function. Note: the numbers within the circle indicate the priorities of that specific structure chain. The less the number, the higher the priority that chain has.

Figure 8:
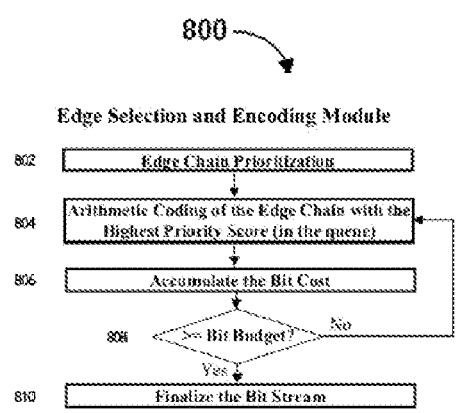
FIG. 8 is an example of a flowchart of a structure-based progressive compression diagram in accordance with some embodiments of the invention.

Referring to FIG. 8, a first flowchart 800 depicting a method for Structure-chain-based progressive compression is shown. It is assumed herein that edge detection, linking, profiling, and edge chain prioritization are completed. Initially, the bit stream and the context for encoding all the edge chain data is performed including structure chain prioritization (Step 802). In a queue, coding of the structure chain with the highest priority score is performed (Step 804). In turn, the accumulation of the bit cost is done (Step 806). A determination is made regarding whether the resultant is greater than or equal to a predetermined budget value (Step 808). If yes, proceed to finalize the bit stream (Step 810). Otherwise, revert back to step 804.

Figure 9:
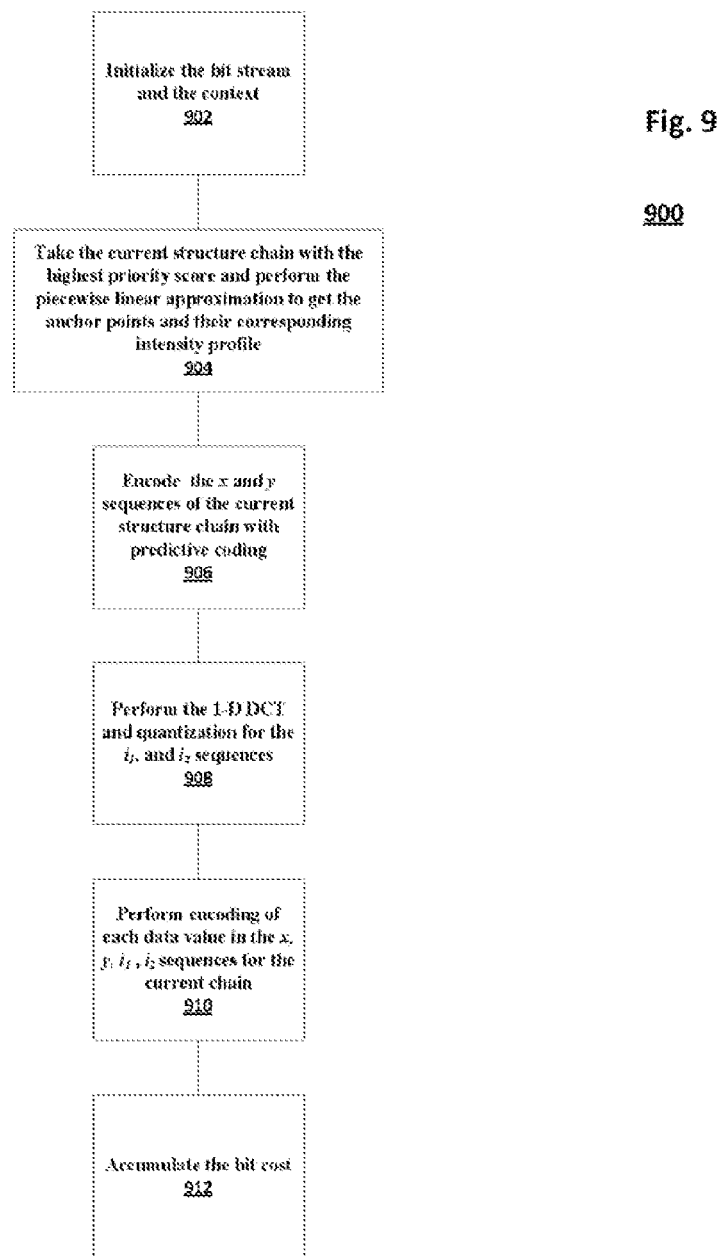
FIG. 9 is yet an example of a flowchart of a structure-based progressive compression diagram in accordance with some embodiments of the invention

Referring to FIG. 9, a second flowchart 900 depicting a method for Structure-chain-based progressive compression is shown. it is noted that the figure presents an adaptive structure-chain-based progressive coding scheme. All the computational steps are within the structure selection and encoding modules, where the structure-chain-based prioritization and partition are performed. The key steps in the process include: Initialize the bit stream and the context (for encoding all the structure chain data) (Step 902). Take the current structure chain with the highest priority score and perform the piecewise linear approximation to get the anchor points and their corresponding intensity profile (Step 904). Encode the x and y sequences of the current structure chain with predictive coding (Step 906). Perform the 1-D DCT and quantization for the $i_1$, and $i_2$ sequences, (Step 908). Perform encoding of each data value in the x, y, $i_1$, $i_2$ sequences for the current chain (Step 910). Accumulate the bit cost (Step 912). If there are more bits available, go to the next structure chain. Otherwise, terminate the bit stream and end the encoding process.

Structure-Driven Image Reconstruction/Decompression

The encoded structure modeling parameters can be used to reconstruct an approximation of the original image. Since structural discontinuities (i.e. edge segments) convey the most information regarding the perception of the image content, the reconstructed image serves as a good "surrogate" for the original image for human observers to perform subjective assessment in ultra-low bandwidth image transmission application. The image decompression/reconstruction primarily consists of the following computational steps (as illustrated in FIG. 1) with the corresponding decoding schemes depicted in FIG. 3:

Step 1. Decode the Structure Modeling Parameter Sequences:

Firstly, both the geometry and intensity bit streams are firstly decompressed using statistical decoder. Secondly, the edge modeling parameter sequences are recovered by performing inverse DPCM on the anchor point location sequences, and by conducting inverse DPCM and inverse 1D DCT on the edge intensity sequences. With these decoded structure modeling parameters, an approximation image can be reconstructed.

Step 2. Image Reconstruction:

The approximation image can be reconstructed in three sub-steps, i.e. un-blurred image reconstruction, blur function generation, and convolution of blurring kernel and un-blurred image. It should be noted that if the blur parameter is "ignored" at the encoding stage, only the first sub-step is needed for image reconstruction.

Un-Blurred Image Reconstruction:

Once the structure chains are reconstructed as poly-line representation from the anchor point locations, we form a two pixel thick profile along the structure chains. The profile thickness can vary depending on applications. The intensity profile parameter values $i_1$ and $i_2$ are interpolated from anchor point locations and put onto the two-pixel thick edge profile. Let us call this "skeleton" image as B(x, y). Note that the image B has intensity values only on the two-pixel thick structure chains, where everywhere else it does not have any intensity value. Thus, the next task is to fill up these gaps in the image B by an inpaiting-like procedure[7, 11]. We utilize the Laplacian equation, $$\nabla^2 I(x,y)=0, \quad (5)$$

with two types of boundary condition (BC)—(a) Neumann BC: on each of the four image borders, the derivative of the image I(x, y) in the direction normal to that image border is zero, and (b) Dirichlet BC: I(x, y)=B(x, y), when (x, y) belongs to the two-pixel thick edges. Solving the Laplacian equation with these boundary conditions yields the image I(x, y). When the blurring parameters have not been utilized in this image reconstruction, we call it an un-blurred image.

Blur Function Generation:

As in the first sub-step, we generate a boundary value image C(x, y) by interpolation of the blur parameter σ on the two-pixel thick reconstructed edges. Next, we use the Laplacian equation to construct the blur function K(x, y):

$$\nabla^2 K(x,y)=0 \quad (6)$$

The boundary conditions used in solving this equation are similar as before. Solving the Laplacian equation yields the blur function K(x, y).

Image Convolution:

The last step in the reconstruction process is the convolution of the blurring kernel and the reconstructed un-blurred image I(x, y) to yield the final reconstruction image, J(x, y):

$$J(x, y) = \frac{1}{2\pi K^2(x, y)} \sum_{(i,j)\in W(x,y)} I(i, j)\exp\left(-\frac{(x-i)^2 + (y-j)^2}{2K^2(x, y)}\right), \quad (7)$$

where W(x, y) is a neighborhood (window) around pixel (x, y).

From the above reconstruction procedure, it is easy to see that the most expensive computation rises from solving the Laplacian partial differential equations (PDE) with boundary conditions. Solving the boundary value PDE problem usually leads to solving a large linear equation system (LES). Techniques for solving sparse linear systems can usually be divided into two broad classes: direct methods and iterative methods. The appropriate technique depends on many factors, including the mathematical and structural properties and the dimension of the matrix. For a 256 by 256 input image, the system matrix is of the size 65536 by 65536, which translates to a linear equation system matrix of size 65536 by 65536. Due to this unduly large size and the structural property of the linear equation system matrix, iterative approaches, such as conjugate gradient[21] and Iterative Back Substitution[22], are good choices. Moreover, multi-grid implementations of the PDE solver can be utilized to further speed up the reconstruction[21].

In addition, memory usage for solving the LES needs to be carefully designed simply due to the enormous matrix size 65536 by 65536. It is observed that the large matrix is sparse and diagonal dominant. Therefore, instead of storing the matrix as a usual 2-dimensional array, a more memory efficient way is to use the sparse representation, in which only the non-zero elements of the large sparse matrix need to be stored. Each non-zero element in the matrix is represented by storing its location in the matrix (by two indices) and the actual values while all zero elements need not be saved, which result in a great reduction of the memory usage for large sparse matrix. For example, the A matrix (for a 256×256 image) requires 17,179,869,184 bytes (at integer level precision) if saved as a 2D array. With the sparse representation, the maximum memory usage can be reduced to only 3,895,440 bytes (i.e. a reduction of almost 99.9%). Furthermore, since the non-zero values in the large sparse matrix are fixed as 1, −1 or 4, further saving can be achieved by storing non-zero elements in three different lists which eliminates the need for storing the actual values. Eventually, only about 2,600,000, bytes need to be stored.

Generally, for image communication applications, the total runtime is the sum of the compression time and transmission time, if the compression and transmission are performed as independent tasks. By taking advantage of the "overlap" between the compression and transmission modules, the overall runtime can be further reduced. In other words, the transmission module does not have to wait until the compression is fully completed. This "progressive" encoding and transmission can be achieved by partitioning the image data into "independent units" and forming the corresponding parallelized encoding and transmission pipelines. Furthermore, this progressive compression and transmission capability also provides the bandwidth adaptability for time varying communication channels.

For achieving this runtime reduction, two progressive encoding and transmission schemes have been developed, as detailed in the following.

Block-Based Progressive Encoding and Transmission Scheme:

In the block-based scheme, an input image is partitioned into several blocks, each of which is encoded and transmitted separately (to form the computational pipelines). Due to the nature of the ASDIC approach, longer and smoother structure chains are modeled and encoded more efficiently. However, since the input image will be partitioned into a certain number of image blocks (with smaller size), the long edges (spreading across multiple blocks) will be broken into several pieces, resulting in more anchoring points and therefore increasing the coding costs. With these considerations, it is easy to see that the block-based progressive coding should use the least number of blocks possible in order to achieve the best reconstruction quality with the same bit budget. Therefore, only two partitioning schemes, i.e., 4-block and 9-block were considered (see FIG. 5). Overall, the desired partitioning scheme should achieve the best tradeoff between edge coding cost, subjective quality, and run-time.

The mechanism designed for achieving runtime reduction using block based scheme is illustrated in FIG. 6 using 4-block partition case. In FIG. 6, the block OPT refers to Overlapped Block Processing and Transmission and the Processing and Transmission form two separate streams. While the transmission stream has to wait for the processing stream, the reverse is not true. The timing of the processing module is independent of the transmission module. The processing module in the case of a 4-Block Progressive Encoding comprises of a Pre-processing step, followed by processing of the 4 blocks and finally a Post-Processing step. The time spent at the Post-processing is negligible and is not depicted in the diagram. The transmission module can start only after the pre-processing and the processing of the first block is completed. Also every successive block transmission module can start only after the corresponding block processing module has completed. In other words, the transmission has to temporarily stop and wait for the processing to complete, in case the next block for transmission has not been compressed. This is depicted by an orange box in the diagram. On the other hand, in case the transmission of a block takes longer than the time required to process the next block, the processing does not stop, but continues with the processing of the next block. This is based on an assumption that the transmit buffer available is large enough to accommodate for all the blocks. The overlapped block processing and transmission is indicated by a green block in the diagram. It is important to make sure that a trade-off is made to keep the time required for processing each block lower than the time required for transmitting it. In other words the estimated time required to transmit each block should be used as a bound to optimize the block-processing computation.

The basic concept for structure-chain-based progressive encoding and transmission is to process structure chains in a prioritized order, as illustrated in FIGS. 7 and 8 presents our design of adaptive structure-chain-based progressive coding scheme. All the computational steps are within the structure selection and encoding modules, where the structure-chain-based prioritization and partition are performed.

Figure 10:
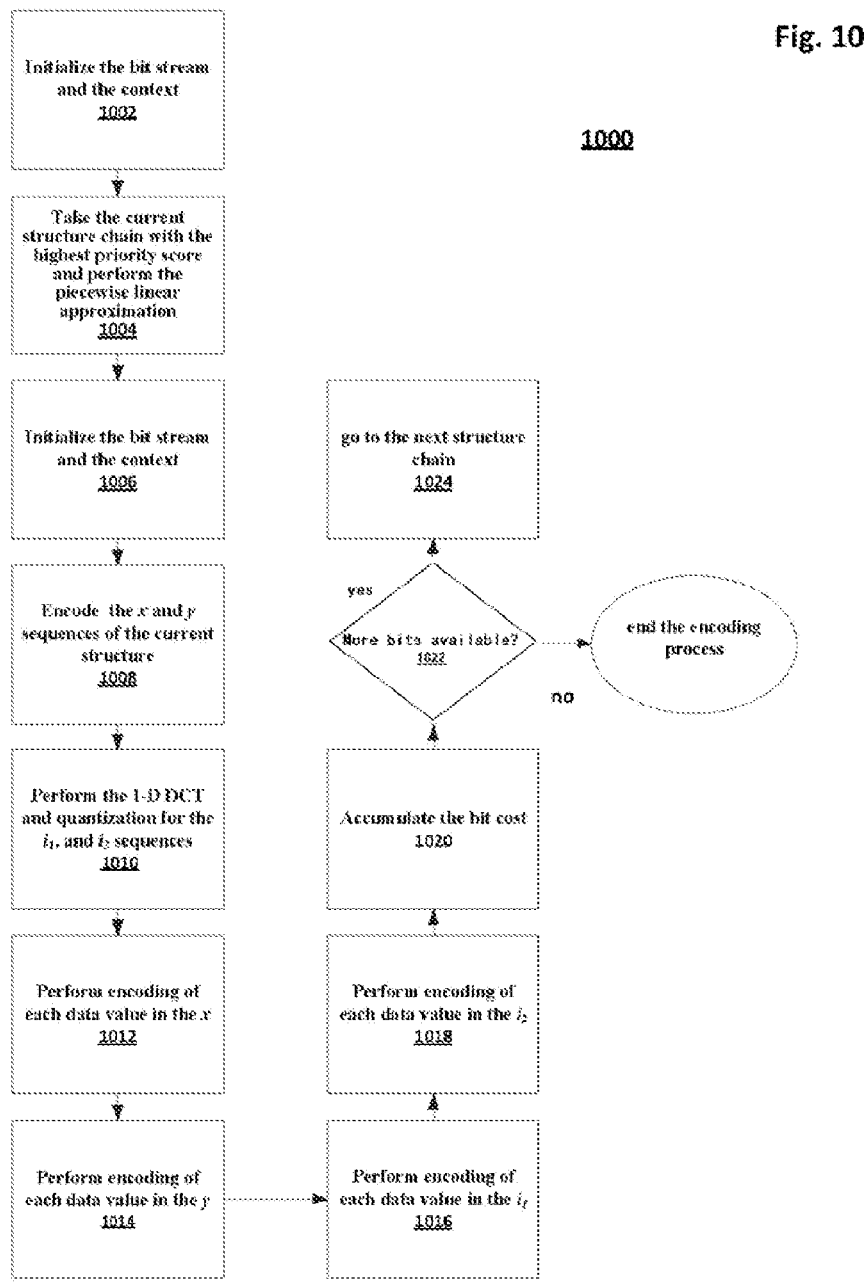
FIG. 10 is still yet an example of a flowchart of a structure-based progressive compression diagram in accordance with some embodiments of the invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Referring to FIG. 10, a second flowchart 1000 depicting a method for the chain-based progressive encoding method is described. The discussions below assume the structure detection, linking, profiling, and prioritization are completed. Initialize the bit stream and the context for encoding all the structure chain data (Step 1002). Take the current structure chain with the highest priority score and perform the piecewise linear approximation to get the anchor points and their corresponding intensity profile (Step 1004). Encode the x and y sequences of the current structure chain with predictive coding (Step 1006). Perform the 1-D DCT and quantization for the $i_1$, and $i_2$ sequences (Step 1008). Perform encoding of each data value in the x sequence for the current chain (Step 1010). Perform encoding of each data value in the y sequence for the current chain (Step 1012). Perform encoding of each data value in the $i_1$ sequence for the current chain (Step 1014). Perform encoding of each data value in the $i_2$ sequence for the current chain (Step 1016). Accumulate the bit cost (Step 1018). If there are more bits available (Step 1020), go to the next structure chain (Step 1022). Otherwise, terminate the bit stream and end the encoding process.

Rate Control Strategies

As the concatenated sequence of each structure chain being encoded, the number of bits used are accumulated and compared with the given bit budget. If the current accumulated cost is less than the bit budget, the encoding of the next chain in the priority list is performed. Otherwise, if the bit budget is met or the next chain bit-stream cannot be completely sent, the encoding process is terminated. This strategy works well for the cases with pre-defined bit budget. For scenarios with dynamic bit budget (i.e. time-varying bandwidth cases), a "blind" rate control strategy can be implemented, i.e. the encoder keeps encoding and sending the bit-stream for each chain without "worrying" about the bit budget. Depending on the data link characteristics at any given time instance, the decoder will receive "the best effort" bit-streams and will use all the bits successfully received to reconstruct the image. It is obvious that the more bits the decoder receives, the better the reconstruction will be.

It is noted that the present Adaptive Structure-Driven Image Compression (ASDIC) method is generally applicable to both Electro-optical (EO) and Infrared (IR) imageries. The ASDIC can be applied to a variety of commercial and defense oriented wireless devices and systems gathering and transmitting visual data under ultra low bandwidth constraints, including video surveillance systems, telecommunications system utilizing video enabled phones, processors or other hardware, and autonomous navigation systems. In addition, the ASDIC can be applied to precision-guided autonomous weapon systems with such as Link-16, CDL, WDL, JTRS, or any other data links, for enabling real-time infrared image compression and transmission. The present ASDIC system can also be used for image compression and transmission within the Network Enabled Weapon data links.

It is noted that the present application possesses the following advantages over current/existing technologies: A novel or improved method to conduct automatic prioritization and selection of the structure information within a given image, which results in better scalable and progressive encoding and transmission of perceptually significant structural features in image data. Highly efficient geometric modeling and statistical modeling of structural chains which achieves higher data size reduction. Novel progressive/scalable structure-driven encoding and decoding schemes that adapts to time-varying communication channels (regarding bit rate and latency). Support object/target-based compression framework. Superior perceptual/subjective quality of reconstructed images compared with the existing or known compression standards.

It is noted that an experiment has been performed using the present ASDIC method and the corresponding software implementation can be used to achieve real-time infrared image compression and transmission for the precision-guided autonomous weapon systems or other types of data links.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

What is claimed is:

1. A decoding method comprising the steps of:
receiving a compressed structure-driven stream of image data via a low bandwidth communication channel, the stream of image data including encoded structure geometry data and encoded structure intensity data that are generated via edge extraction, wherein said edge extraction includes edge thinning and edge linking to form edge contours, and wherein said edge contours are decomposed into structural chains including said structure geometry data and said structure intensity data and the structural chains are prioritized and certain structural chains eliminated based on a threshold number of edge pixels;
decompressing the compressed and encoded stream of image data to recover the encoded structure geometry data and the encoded structure intensity data from said structural chains, wherein the step of decompressing the compressed stream of data comprises performing geometric specific statistical decoding of the stream of data to recover geometric predictor and differentiator sequence data and wherein said step of decompressing comprises
decompressing the encoded structure geometry data and statistically decoding the geometric profile of each received structural chain and then
decompressing the encoded structure intensity data and statistically decoding the intensity profile of each received structural chain; and
reconstructing an image associated with the decoded image data.

2. The method of claim 1 further comprising the step of outputting information associated with the image.

3. The method of claim 1, wherein the reconstructing step uses at least one partial differential equation.

4. The method of claim 1, wherein the reconstructing step uses a sparse linear equation system to reconstruct image data associated with the structure information.

5. The method of claim 1 wherein the low bandwidth communication channel comprises a wireless communication channel where a speed of transmitting image data cannot achieve real time effect without data processing.

6. The method of claim 1 wherein the image data is encoded as four separate sequences including anchor point locations, $i_1$ sequences, $i_2$ sequences and a blur estimate sequence.

7. The method of claim 6, wherein the reconstructing step uses at least one partial differential equation.

8. The method of claim 1 wherein the structure intensity data comprises intensity values on opposing sides of respective edge segments.

9. The method of claim 1 wherein said image data stream is further subjected to inter-chain predictive decoding.

10. The method of claim 9 wherein said image data stream is further subjected to intra-chain predictive decoding.

11. The method of claim 9 wherein said image data stream is further subjected to inner-chain predictive decoding.

12. The method of claim 1 wherein said step of reconstructing the image comprises the steps of un-blurred image reconstruction, blur function regeneration, and convolution of blurring kernels and the reconstructed un-blurred image.

13. The method of claim 1 wherein said step of reconstructing the image comprises un-blurred image reconstruction.

* * * * *